July 6, 1954  
I. J. FILLER  
2,682,839  
CORN DOUGH PROCESSING MACHINE  
Filed July 8, 1948  
6 Sheets-Sheet 1

Inventor  
ISADORE J FILLER

ATTORNEYS

July 6, 1954

I. J. FILLER 2,682,839

CORN DOUGH PROCESSING MACHINE

Filed July 8, 1948

Inventor
ISADORE J. FILLER

By
Shreve, Crower & Gordon
ATTORNEYS

July 6, 1954

I. J. FILLER 2,682,839

CORN DOUGH PROCESSING MACHINE

Filed July 8, 1948

Inventor
ISADORE J. FILLER
By
Shreve, Crown & Gordon
ATTORNEYS

Patented July 6, 1954

2,682,839

UNITED STATES PATENT OFFICE 2,682,839

CORN DOUGH PROCESSING MACHINE

Isadore J. Filler, Atlanta, Ga.

Application July 8, 1948, Serial No. 37,618

2 Claims. (Cl. 107—12)

Generically this invention relates to a dough forming and processing apparatus, but it more especially is directed to such an apparatus for handling a particular type of dough having substantially no adhesive consistency, such as that formed wholly of corn, the resulting product being somewhat of cracker like form, or corn chips.

The dough formed from the cooked whole corn kernels includes all the vitamins and nutritious constituents of the corn, and, unlike wheat dough, is devoid of substantial adhesive characteristics, and therefore the particles are readily separable, whereby the prevalent form of scraper means for removing the contacting surfaces of the sheet of dough from the pressure rolls, could not operate without disrupting the continuity of the sheet formation. Therefore, one of the principal objects of this invention is the provision of wire scraper means engageable with the surfaces of the respective compression rolls for removing the sheet of dough therefrom without disrupting the continuity of the sheet formation.

Another important object of the invention is the provision of tension wire holding means for holding the respective scraper wires in tensioning contact with each of the respective rolls throughout the length of its surface contact therewith and at predetermined points of dough removal with respect to the rolls.

A further important object of this invention is the provision of a demountable substantially U-shaped scraper wire holding frame for each of the compression rolls, and means for securing a scraper wire under tension across the open end of each frame, when the wire is threadedly positioned under the tensioning wire holding means of the respective rolls, each of the frames being so mounted that the weight of the free end of the frame tends to additionally maintain the scraper wire in contact with the rolls.

Further objects of the invention will become apparent as the description proceeds and the salient features of the invention will be pointed out in particularity in the appended claims.

The present invention will be understood more readily by reference to the accompanying drawings which represent one form of the embodiment of a mechanism embracing the improvements of the present invention, wherein

Fig. 6 is a fragmentary side elevation of a cutting and conveyor assembly, together with mounting means for certain of the elements thereof, employed as a unit in the system of apparatus of the present invention.

The present invention relates to an improved device for producing a particular corn chip product wherein whole kernels of corn are cooked in water at a predetermined temperature for a definite time period, the cooked whole corn unmixed with any other ingredient is then by a suitable mechanism formed into a dough of the requisite consistency. This dough after being suitably shaped is then fed to a pair of compression rolls which form the dough into a thin continuous sheet, and as the sheet emerges from the compressing operation, its contacting surface is removed from one of the rolls and directed to the other roll which delivers it to cutting means for cutting it into longitudinal strips and as it passes from said cutting means it is removed from this roll and directed to conveyor means, all in a manner such as not to disrupt the continuity formation of said sheet, which is delivered by said conveyor to a cooperating transverse cutting means for forming said strips into squares, said squares being then delivered to a cooking bath of heated vegetable oil or other cooking medium, floatingly impelled therethrough and drainingly elevated therefrom and delivered to a suitable receptacle in the form of crisp corn chips, ready for salting and packaging.

Referring more particularly to the drawings, the apparatus illustrated therein consists of an assembly or stand A of cooperating rolls for receiving the dough prepared as indicated above, a conveying and cutting assembly B, and a cooking unit C, the dough being adapted to be moved sequentially through the system beginning with the pressure rolls and the conveyor and cutting assembly B, and ending with the cooking unit C. Each of these sequential instrumentalities will now be described.

The roll stand A and associated parts will be described first: This roll stand A comprises a base having spaced side bars 1 and 2, connected by cross bars 3 and 4 to complete a base frame, the side bars 1 and 2 carrying roller end plates 5 and 6 in which are mounted shafts 7 and 8 of cooperating pressure rolls 9 and 10, the roll 9 being shown as being the first or outer roll of the roll stand, and the roll 10 being the second or inner roll of the stand. These rolls are mounted on shafts 7 and 8 that are mounted removably in the end plates 5 and 6. For this purpose, the shaft 7 of the first roll 9 is shown as being mounted at its ends in corresponding bearing blocks, one of which is indicated at 11 which is received in a recess 12 therefor in the end plates removably held in properly adjusted position by a set screw, such as is shown at 13 which operates in a closure plate 14 for recess 12, and which is held in position by a lock nut 15, the set screw or bolt 13 having a head 16 thereon for receiving a suitable operating tool.

Figure 1:
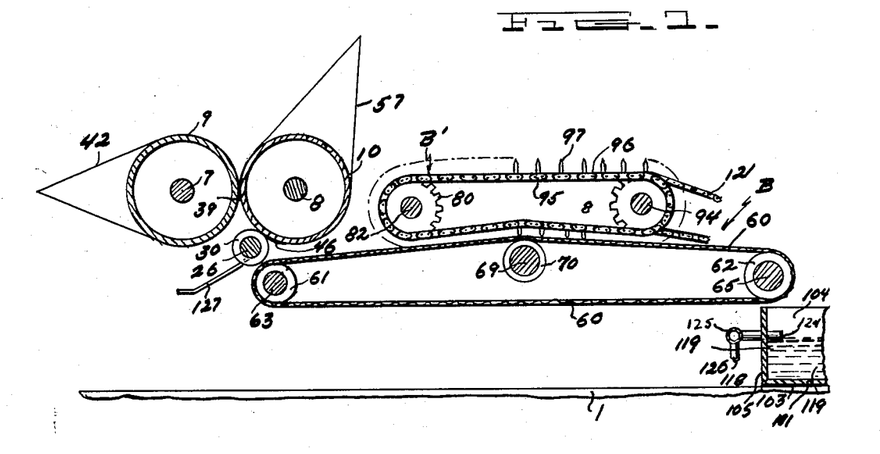
Fig. 1 is a diagrammatic sectional elevation of the forward portion of the apparatus constructed in accordance with the present invention.
Figure 2:
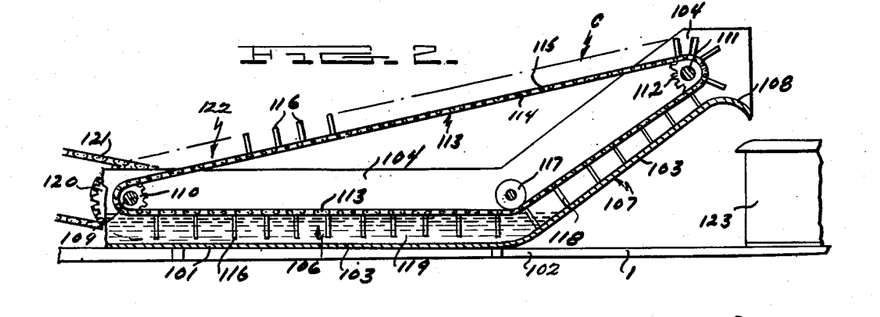
Fig. 2 is a view similar to Fig. 1 and a continuation of the apparatus of Fig. 1, Figs. 1 and 2, when taken together, illustrating the complete apparatus for carrying out the present invention.
Figure 3:
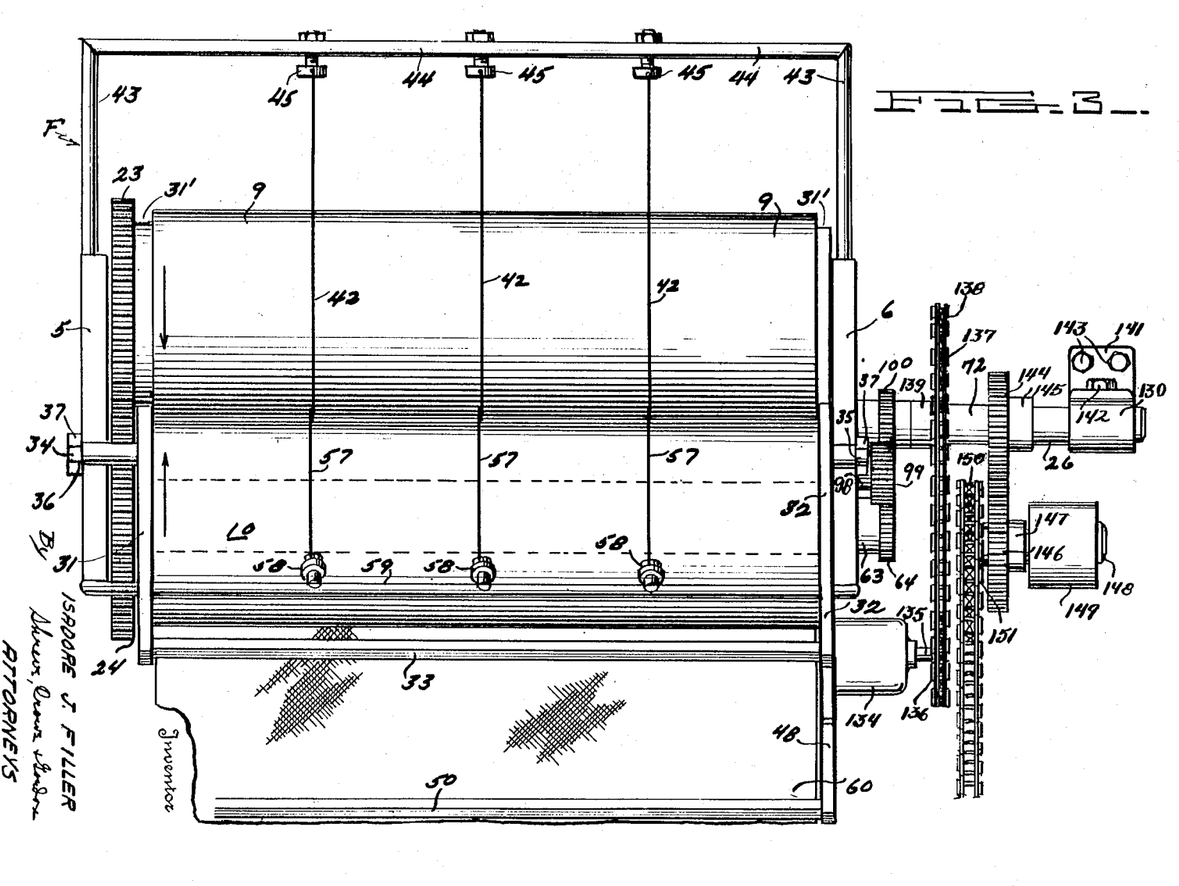
Fig. 3 is a plan view of the pressure rolls and portions of the improved scraping instrumentalities of the invention, together with portions of the drive system for the units of the mechanism.
Figure 4:
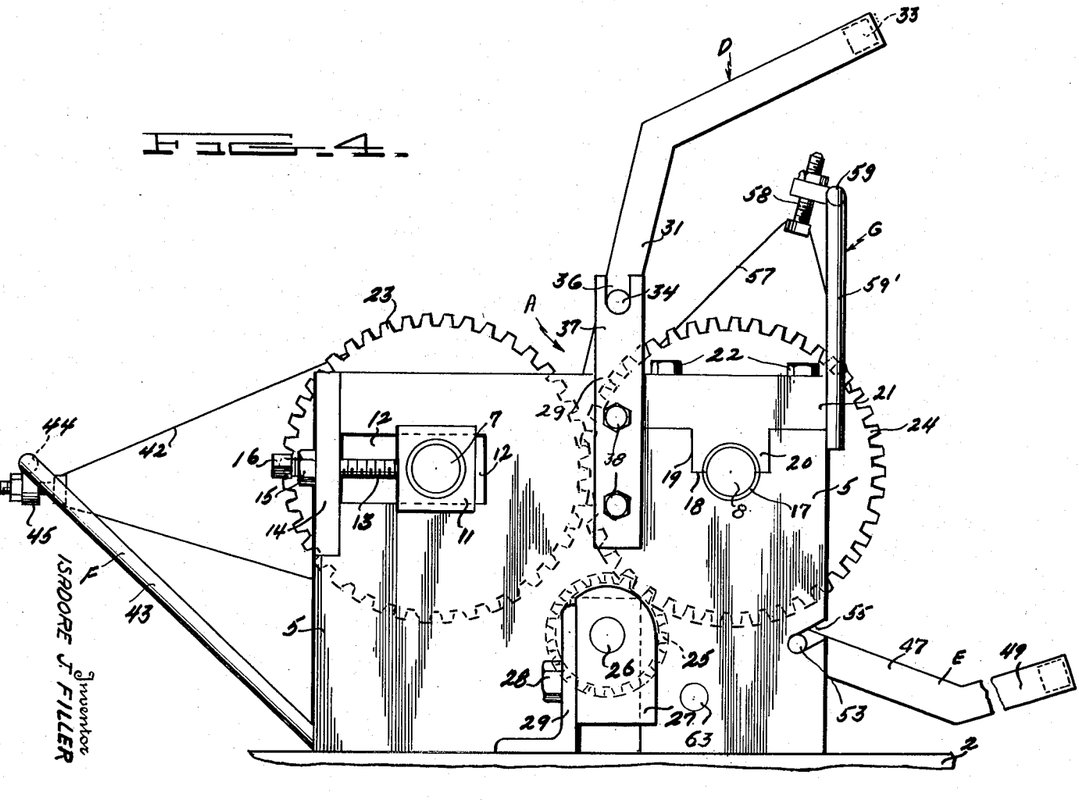
Fig. 4 is an end elevation of the pressure rolls of the mechanism, the view looking from the left of Fig. 3.

The shaft 8 of the second or inner roll 10 operates in bearings formed in the end plates 5 and 6, these end plates being provided with a semi-circular recess 17 in the bottom 18 of a recess 19, in which recess fits a tongue 20 of bearing closure 21, the tongue 20 being provided with a semi-circular recess complementary to the recess 17 that completes the bearing for the shaft 8 when the bearing closure 21 is fitted and locked by the locking screws 22, as will be apparent from Fig. 4. This mounting construction enables adjustment or removal of the rolls as may be desired.

The rolls 9 and 10 are provided at one end with meshing gears 23 and 24, a driving pinion 25 mounted on a shaft 26 meshes with gear 24 to drive the roll 10 as shown, the driving of roll 10 thereby rotating the roll 9 in a direction opposite to that of the driven roll 10, as will be clear from Fig. 4. The shaft 26 is mounted in bearing blocks such as that shown at 27 that are slidable relative to the end plates 5 and 6, which are recessed correspondingly to permit adjustment and removal of the shafts 26, the bearing blocks 27 being held by bolts 28 passing through angle members 29 suitably mounted on the bars 1 and 2 of the base frame adjacent to the end plates 5 and 6.

The shaft 26 carries longitudinally spaced cutting discs 30 that cooperate with the roll 10 as will be pointed out hereinafter in greater particularity, and operatively associated with the rolls 9 and 10 are the demountable scraper frames shown in Figs. 8 and 9, and which are indicated generally by reference characters D and E, respectively.

Figure 5:
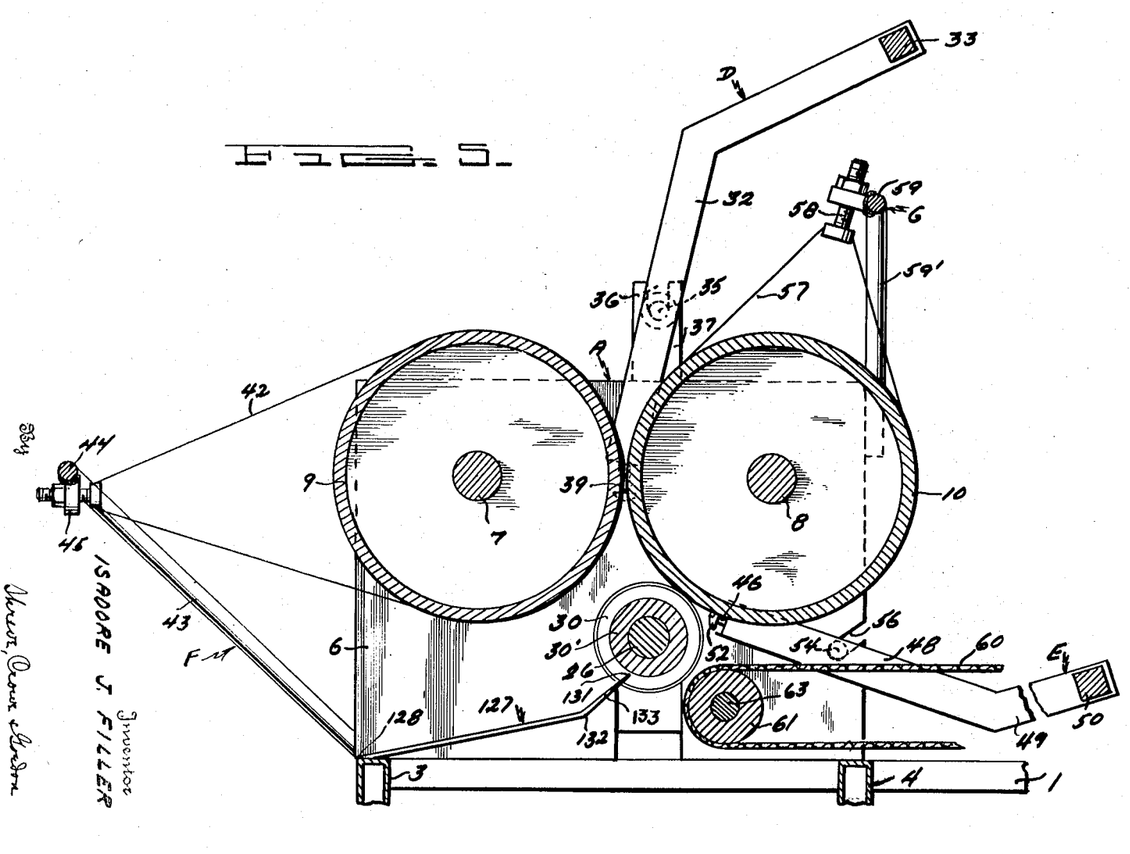
Fig. 5 is a sectional elevation taken on the line 5—5 or Fig. 3, looking in the direction of the arrows.
Figure 9:
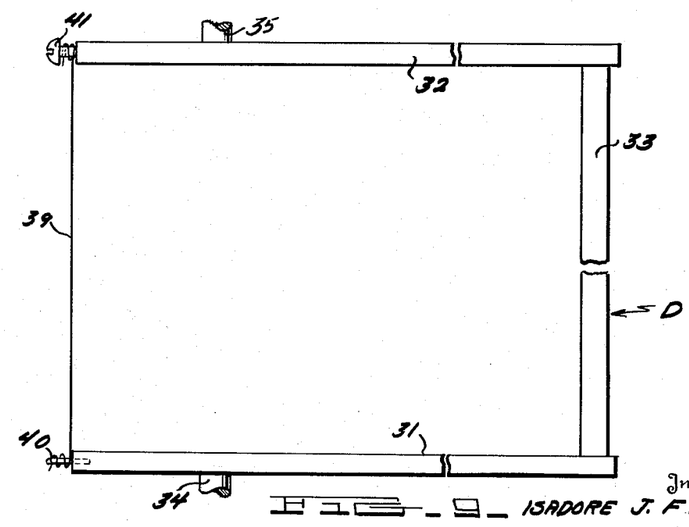
Fig. 9 is a view similar to Fig. 8 showing a demountable scraper frame carrying another of the scraper wires employed in accordance with this invention, the frame of this view being adapted to be used with the first or outer roll of Figs. 1, 3, 4, and 5.

The frame D of Fig. 9 is adapted to be used in connection with the first, or outer roll 9 of the roll stand. This frame D comprises side bars 31 and 32 that are bent angularly as shown in Fig. 5, the outer ends of the side bars being connected by the cross bar 33 and being provided also with trunnions or pivots 34 and 35 which rest in the notches or recesses 36 in the upright standards 37 attached to the end plates 5 and 6 by bolts 38. The side bars or arms 31 and 32, are adapted when their trunnions are operatively seated in the recesses 36 and 36, to engage in the annular recesses 31' at the ends of the roll 9 to properly position the scraper wire 39. Roll 10 is recessed similar to roll 9. The side bars or arms 31 and 32 mount the scraper wire 39 between them, one of the arms, for instance, the arm 31 having a rigid fastening means 40 mounted in the end for the scraper wire 39, the other arm 32 being provided with, in the present instance, tension-adjusting screw 41 for said wire 39, whereby the tension thereof may be adjusted as required, this scraper wire being positioned in service in surface contact engagement with roll 9, when frame D is operatively positioned.

Mounted on the end plates or cross bar 3 is a supporting frame F clearly shown in Figs. 4 and 5 for the spaced trio of retaining tension wires 42. Said frame F comprises arms 43 extending angularly upward from the end plates 5 and 6 or cross bar 3 which arms are connected by a cross bar 44 on which are mounted tensioning bolt means 45 to which the spaced wires 42 are respectively attached. These wires pass around the roll 9 and over the scraper wire 39 for retaining the wire in proper engagement with the roll 9, said scraper wire adapted to be threaded beneath the tensioned retaining wires 42, and tightened in the demountable U-frame or holder D. The engagement of said wire 39 with surface of roll 9 is augmented by the formation of frame D and the weight of cross bar 33.

Figure 8:
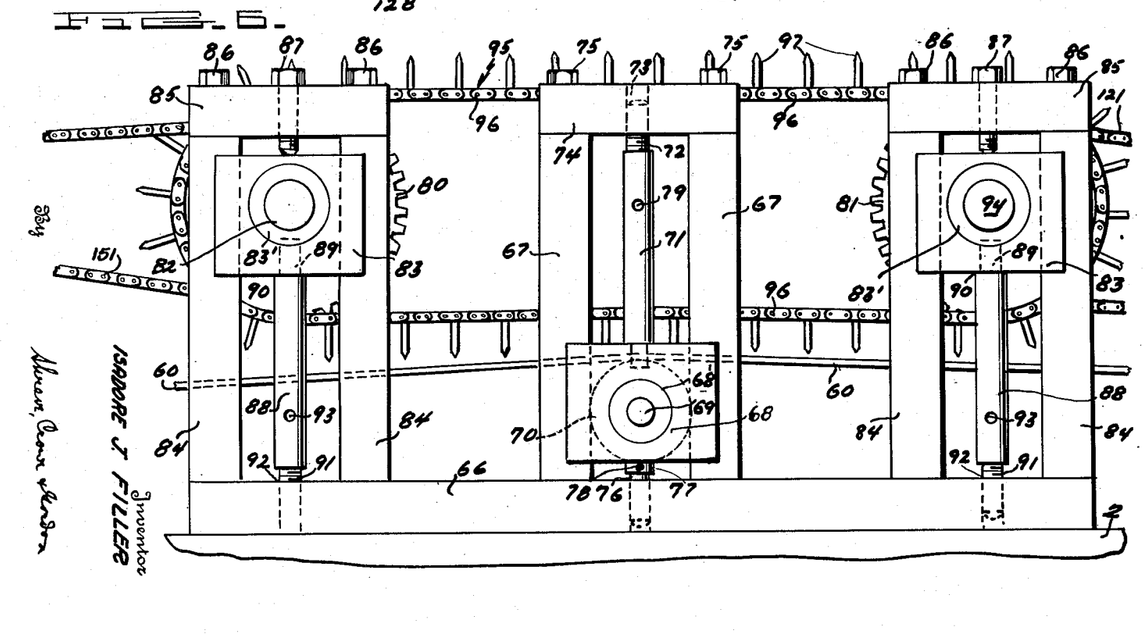
Fig. 8 is a fragmentary plan view of a demountable scraper frame carrying one of the scraper wires constituting an important feature of the invention, the view showing the frame employed in cooperation with the second, or inner, pressure roll of Figs. 1, 3, 4 and 5.

The second, or inner, roll 10 is provided with a wire scraper 46 which is carried by a demountable U-shaped frame E, shown in Fig. 8, the said wire being engaged with the roll 10 beneath the trio of tensioning wires now to be described, and their supporting frame G.

The U-shaped frame E comprises side arms 47 and 48, the outer ends of which are similarly angularly off-set as indicated at 49, and connected by cross-bar 50, the scraper wire 46 being mounted on, and extending across the inner ends of the side arms 47 and 48, said wire being secured fixedly to one of the arms, as is indicated at 51, and being adjustable as to tension by means of a tension-adjusting screw 52 similar to 41 of frame D. The side arms 47 and 48 are provided with oppositely extending trunnions or pivots 53 and 54 that are received in open recesses 55 and 56, respectively, disposed at suitable angles in the lower portions of the end plates 5 and 6. Roll 10 is recessed, similar to roll 9, to receive the arms 47 and 48. The side arm 48 of the frame E preferably is longer than the side arm 47 so that the scraper wire 46 will engage the roll 10 along the under side of the roll at an angle to the longitudinal axis of the roll. The scraper wire 46 is held in position by the trio of tensioned retaining wires 57 which pass around the roll 10 over the scraper wire 46 and are secured by tension adjusting means 58 mounted on the cross bar 59 supported by bracket arms 59' of the frame G welded or otherwise secured to end plates 5 and 6. Said scraper wire 46 is threaded beneath the retaining wires 57, similar to wire 39, and is maintained by said wires closely engaged against the underside of said roll 10 at an angle to the longitudinal axis thereof as above stated, and assisted by the weight of cross bar 50, similar to bar 33. The scraper wire 39 which is intermediate the rolls 9 and 10 is secured against the surface of the first or outer roll 9 in scraping engagement therewith at a location immediately below the zone of maximum pressure between the said rolls and serves to remove and direct the corn dough from the surface of the roll 9 onto the surface of the roll 10 to which it now adheres, and without interruption to the longitudinal continuity of the resulting sheet of dough. It will be recalled that this dough is free from any added binding materials, and therefor, owing to its inherent crumbling nature it is difficult to remove the engaging surface of the compressed dough sheet from roll 9 so that it will continue in surface adhering engagement with roll 10 without disruption. Therefore, as the dough sheet is removed from the roll 9 by the scraper wire 39 it is continuously guided by this wire to the second roll 10, and by which it is carried to a predetermined point where it is subjected to the longitudinal cutting operation.

The shaft 26 which carries the driving pinion 25 for the rolls carries also a series of spaced cutting discs 30 that are swedgingly or otherwise mounted directly on a sleeve 30' suitably secured to the shaft 26. These discs 30 slit the dough sheet longitudinally thereof while the sheet is on the surface of the roll 10 and in advance of the scraper wire 46, with reference to direction of rotation of the roll 10, it being recalled that scraper wire 46 operates against the surface of the roll 10 beneath the roll, so that when the dough sheet on the roll 10 reaches said wire it will have been slit by the cutter discs 30 into a plurality of longitudinal strips, the number of which depends upon the number of cutting discs 30 mounted along the shaft 26. The scraper wire 46 removes these strips continuously from the roll 10 without interruption to their longitudinal continuity in a manner such that they are deposited upon a conveyor belt 60 without disturbing their sheet formation and in which form they are delivered to the conveying and cutting assembly B, which will be referred to in greater particularity hereinafter.

Since the scraper wire frames D and E, which carry the scraper wires 39 and 46, respectively, merely seat in open recesses provided on and in the end plates of the roll stand A, it will be apparent that these frames can be readily demounted from their position in the event of breakage of either of the scraper wires, which sometimes happens in service, to enable the attachment of a new scraper wire in position on the frames with one end of the new wire secured to the fastening device 40 or 51 on the respective frames. Then the frame D or E is remounted in place and the free end of the new scraper wire is passed beneath the retaining wires and secured to tensioning means 41 or 52 of the frames D or E, which means then is adjusted to bring the new scraper wire into the requisite degree of tautness against its roll. The retaining wires 42 or 57 are tensioned by adjusting the tensioning bolts 45 or 58 as the case may be. The rolls 9 and 10 then are ready for operation.

It has been said that conveyor belt 60 of the conveying and cutting assembly B receives continuously the slit dough sheet from the roll 10 as the strips are removed from the roll by the scraper wire 46 without destroying the continuity of said sheet. The conveyor belt 60 is a wide endless belt, corresponding in width to the length of the roll 10, and passes around end rollers 61, 62, the roller 61 being mounted on shaft 63 journaled in end plates 5 and 6, that carries on one end a driven gear 64 for driving the conveyor belt 60 as will be explained hereinafter. End roller 62 is an idler roller for guiding the movement of the belt 60 in the usual well-understood manner and is mounted on a shaft 65, said shaft 65 being mounted in bearings suitably supported on frame members 1 and 2 shown fragmentarily in Figs. 5 and 6.

Mounted on said bars 1 and 2 at opposite sides of the conveyor belt 60 are frame members 66 and midway of their length is suitably mounted a respective pair of aligned spaced frame standards 67 between each of which is mounted a slidable bearing block 68 and bearings 68' in which is journaled shaft 69 of idler roller 70 over which travels the conveyor belt 60. Each of said blocks 68 has the lower end of an adjusting rod 71 journaled in its upper surface, the upper threaded end 72 of which is engaged in the interiorly threaded opening 73 in a cross-bar or head 74 interconnecting the upper ends of standards 67 to which it is removably secured by screw bolts 75. Threadedly mounted in frame members 66 in vertical alignment with the adjusting rods 71 are the stub rods 76 with their upper ends projecting in suitable openings in the lower surfaces of the bearing blocks 68, said blocks aligned to seat on collars 77 suitably mounted on rods 76 formed with one or more openings 78 for receiving a tool for rotating said rods 76 for effecting the vertical adjustment of said blocks and idler roll 70. Each of said rods 71 is provided with an opening 79, similar to opening 78, in which is adapted to be inserted a suitable tool for rotating said rod to permit the vertical adjustment of bearing blocks 68 and idler roller 70 by said rods 76 to deflect upwardly out of a horizontal course the upper stretch of said conveyor belt 60 for a purpose directly more fully appearing.

With further reference to the conveying and cutting assembly B, the endless conveyor 60 having been described the endless transverse cutting unit B' adapted to synchronously travel with and predeterminedly engage the upper surface of said conveyor will now be described.

The transverse cutter unit B' comprises end pairs of sprocket wheels 80 and 81, respectively. The sprockets 80 are mounted on and spaced from the ends of a shaft 82 journaled in bearings 83' of bearing blocks 83 slidably mounted between respective pairs of vertical frame standard members 84 suitably mounted on and secured to the frame members 66 at opposite sides of the conveyor 60. Interconnecting the upper ends of standards 84 are the cross-bars or heads 85 secured by screw bolts 86, and threadedly extending through said cross-bars for adjustably locking the bearing blocks 83 in adjusted position are the stub bolts 87. The adjusting rods 88 are similar to the adjusting rod 71 above described, except being reversed, and with their reduced ends 89 journaled in the lower surfaces of bearing blocks 83 which are supported on shoulders 90, the lower reduced threaded ends 91 being engageable in the internally threaded openings 92 in frame members 66. Said rods are adjustably rotated by means of a suitable tool insertable in openings 93, similar to rods 71.

The pairs of sprockets 80 and 81 are equispaced on opposite sides of the frame standards 67 and roller 70. Said pairs of sprockets 81 are mounted on shaft 94 in alignment with sprockets 80, carried by drive shaft 82, and as the supporting standards, bearing blocks, and associated instrumentalities for shaft 94 are identical with those for shaft 82 they bear the same reference numerals, said shaft 94 being journaled in bearings 83' and adjustably supported and controlled similar to shaft 82 above described.

Mounted on each pair of aligned sprockets 80—81 is an endless sprocket chain 95 formed of links 96 pivotally interconnected. Mounted on and spanning the chains 95 are the transversely extending spaced cutters 97 of a length coextensive with the width of the conveyor belt 60 and are rigidly attached to the links 96. The spaced cutters 97 engage the conveyor belt 60 adjacent to the rise of said belt occasioned by the passage thereof over the roller 70 to cut the strips of dough being conveyed on said belt, in the form of a dough sheet, transversely into square-shaped units or pieces which are ready to be cooked into crispy corn chips.

Mounted on a stub shaft 98 suitably secured to and projecting from end plate 6 at a point above the horizontal plane of the shafts 26 and 63 is an idler gear 99 meshing with a driving gear 100 on drive shaft 26 and gear 64 on shaft 63 of end roll 61 for driving conveyor belt 60 in dough-conveying direction and at the same speed as the endless transverse cutter unit B', in a manner such that the contiguous upper stretch of the conveyor and the lower stretch of the same cutter unit will travel in the same direction so that the cut dough is not materially altered as to sheet form and is delivered by said conveyor 60 in such form to the cooking unit or section C.

The cooking unit C comprises a substantially rectangular tank 101 supported on a suitable frame structure 102 and is formed with a bottom 103, vertical sides 104, and an end 105. Said tank includes a horizontal cooking section 106 extending upwardly from its end in an upwardly vertically inclined draining portion 107 forming a continuation of said tank and terminating at its free or elevated end in a downwardly curved discharge lip portion 108. Journaled in the side portions 104 and spaced from the end 105 is a shaft 109 and mounted on and secured to the shaft within the tank vertically spaced from the bottom 103 and adjacent to sides 104 are the sprockets 110 mounted on and secured to said shaft. A similar shaft 111 carrying similar sprockets 112 is journaled in said sides 104 adjacent lip 108 in an elevated position with respect to shaft 109. Mounted on the aligned sprockets 110 and 112 at each side of the tank is a pair of endless conveyor sprocket chains 113 the links 114 of which are pivotally connected as at 115. Spanning said chains and suitably connected to certain of the links 114 are an endless plurality of conveyor perforated paddles 116. Mounted on the elbow or bend of the drain section 107 and the horizontal cooking section 106 is an idler roller 117 mounted on shaft 118 journaled in sides 104 and which maintains the direction of the chains 113 in parallelism with the bottom 103 with the conveyor paddles 116 dipping into the heated cooking medium 119, such as vegetable oil, fats and the like, but with their free edges spaced from the bottom 103, and maintaining the upward course of said chains in parallelism with the bottom of the inclined section 107, with the free edges of the paddles extending into sweeping relation with said bottom for a purpose directly more fully appearing. One end of the shaft 109 projects beyond the side 104 and carries a sprocket 120 secured thereon which is connected with a sprocket (not shown) mounted on one end of shaft 94 by sprocket chain 121 or which may be driven by any other suitable driving connection, as desired, for driving the endless paddle conveyor 122. Any suitable means may be employed for heating the cooking medium 119 contained in tank 101, and any suitable receptacle 123 may be positioned under the discharge lip 108 for receiving the cooked chips as they are discharged therefrom by conveyor 122.

The tank 101 is mounted with its intake end immediately below the discharge end of the conveyor 60 in position to receive the dough fragments or squares as they are delivered thereto by said conveyor. In order to prevent an excessive accumulation of the cut dough pieces or squares from piling up and becoming burned in the heated cooking medium 119 before they are impelled forward by the paddles 116, there is mounted in the end 105 of the tank one or more, preferably a plurality of nozzles 124 communicating with a longitudinal manifold 125 connected by a pipe 126 with a source of compressed air, the air being injected into the heated bath substantially at its surface level tends to cool the bath and incoming dough pieces somewhat and prevents them from piling up and becoming burned, at the same time impelling them through the cooking medium sufficiently to be picked up by the paddles 116 as they enter said heated medium and floatingly move them in separable condition at a predetermined speed through the cooking medium 119 the length of the cooking unit or section 106. It will be understood that the cooking medium 119 is maintained at a temperature such that said dough pieces will be predeterminedly cooked to a highly brittle or crispy condition by the time they are conveyed to the angularly disposed section 107, and as they are conveyed upwardly along said inclined section, any excess cooking medium is drained therefrom, and by the time they are discharged from lip 108 they will be ready for salting and in a dry immediate consumable and/or packaging condition.

Figure 7:
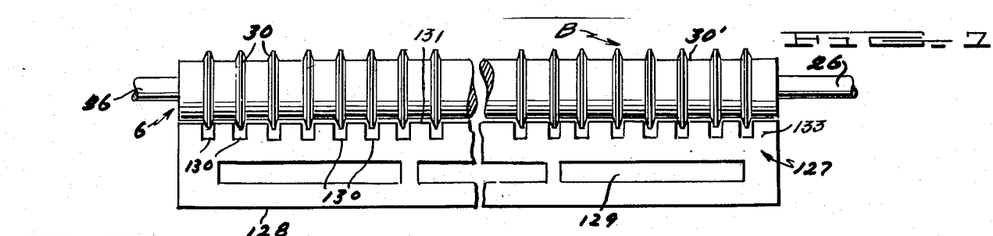
Fig. 7 is a longitudinal elevation of additional cutting means employed in the present system, with mounting and guard means therefor shown fragmentarily, the view showing the cooperation between the guard means and the cutting means whereby the latter are maintained clean by wiping engagement with the guard means.

With further reference to the longitudinal dough cutting discs 30, described as being spaced along the sleeve 30' mounted on shaft 26, a plate guard member 127 is suitably positioned along the base frame of the roll stand A, formed adjacent to its lower or free edge 128 with cut-out portions 129 and adapted to extend adjacent to sleeve 30', spaced clearances or recesses 130 being provided in its upper edge 131 for the accommodation of the cutter discs 30 to produce a wiping contact therewith, so as to maintain said discs free from accumulating dough. Said guard member is bent at 132 to form the sharply upwardly inclined apron portion 133.

A motor 134 is, in the present instance, mounted substantially adjacent to the roll stand A and below the supporting frame and below the conveyor 60, said motor having a shaft 135 which carries a sprocket 136 connected to sprocket 137 by a drive chain 138. The sprocket wheel 137 is mounted on shaft 26 and is formed with a hub portion 139 suitably secured to said shaft. The free end of said shaft 26 is journaled in bearing 140 secured to angle member 141 by a fastening element or bolt 142, said angle member being secured by bolts 143 to a frame structure (not shown). A gear 144 formed with hub 145 is carried by and suitably attached to shaft 26 and is adapted to mesh with gear 146 having hub portion 147 mounted on and secured to stub shaft 148 supportingly journaled in bearing element 149, the latter being supported similar to bearing 140. Mounted on the free end of stub shaft 148 is a sprocket wheel 150 which is connected by a sprocket chain 151 with a sprocket (not shown) mounted on the free end of shaft 82 for driving the transverse cutting unit B' as will be well understood.

The drive for the various compression rolls, cutters and conveyors will now be described. Said drive is from motor 134, shaft 135, sprocket 136, chain 138, sprocket 137, to shaft 26, which is the main drive shaft for the apparatus, and from said shaft 26 through sprocket 25 roll gears 24 and 23 driving the rolls 9 and 10 in opposite or dough compressing direction. Shaft 26 at the same time drives the rotary longitudinally dough sheet cutters 30 carried by said shaft, and gear 108, idler 99, gear 64, shaft 63 and roll 61 driving endless conveyor 60. Also and simultaneously a further drive is from shaft 26, gear 144, gear 146, shaft 148, sprocket 150, chain 151 to shaft 82 through a sprocket thereon (not shown) and sprockets 80, chains 95 of the transverse cutter unit B', sprockets 81, shaft 94, sprocket thereon (not shown) chain 121, sprocket (not shown) on shaft 109, sprockets 110, chains 113, sprockets 112, to shaft 111 and which completes the drive for the apparatus, and for the latter phase of the drive for the tank endless paddle conveyor, from shaft 94 to 111.

While the operation of the machine would seem to be clear from the above description it might be well to further state that I have provided a method and apparatus for producing from a dough made from whole kernels of corn, and of a crumbly nature, comprising wire scraper means and means in connection with the respective compressor rolls for maintaining the scraper wires in surface contact with the rolls throughout their length; removable scraper wire carrying frames permitting the replacement of any broken wire, said wires when replaced adapted to be tensioned in their respective holder frames, one of said wires adapted to separate the contacting surface of the dough sheet from one of the rolls and direct said sheet to the other roll, the other scraper wire adapted to remove the sheet from the second roll after it has been subjected to a slitting operation without materially disturbing the sheet formation and delivering it in such form to an endless conveyor; cutter means coacting with the said conveyor to transversely cut the slit sheet into square pieces which are delivered from said conveyor to a tank containing a heated cooking medium, and means in connection with said tank for pneumatically dispersing the chips and tending to cool the contacting cooking medium as they are introduced thereto, and at the same time to impel the chips forward to prevent burning and to where they can be picked up for further propulsion, and means in the tank for propelling the pieces through the fluid substantially the length of the tank at a predetermined speed to impart to them the desired characteristics and conveying them along a vertically inclined section of the tank to effect drainage of the cooking fluid and drying of the pieces to produce crispy chips.

From the above it will be apparent that I have provided a device for producing, from a dough made entirely from corn, crispy corn chips of a substantially uniform shape, said device comprising relatively few parts, said parts being easily removable and replaceable, yet a device simple in construction, and efficient for the purposes intended.

Although in practice it has been found that the form of the invention illustrated in the accompanying drawings and referred to in the above description as the preferred embodiment is the most efficient and practical, yet realizing that conditions concurrent with the adoption of the invention will necessarily vary, it is desired to emphasize that various minor changes in details of construction, proportion and arrangement of parts, may be resorted to within the scope of the appended claims without departing from or sacrificing any of the principles of this invention.

Having thus described the invention, what is desired to be protected by Letters Patent is as set forth in the following claims:

1. Scraper apparatus adapted to remove in unbroken condition, strips or sheets of corn dough from a forming roll adapted to form such dough into strips or sheets of indeterminate length, which comprises a scraper wire extending along the surface of the roll along a line parallel with the longitudinal axis of the roll, mounting instrumentalities for the scraper wire including a frame having opposed arms, tensioning means for the wire at one end thereof carried by the said arms, supplemental tensioning means for the scraper wire comprising a plurality of spaced tensioned wires on the surface of the roll and passing over the said scraper in engagement therewith intermediate the ends thereof, the said spaced wires uniformly pressing the scraper wire throughout its length against the surface of the roll, and individual tensioning means for the said spaced wires for independently adjusting the tension of each of the said spaced wires.

2. Scraper apparatus for continuously removing in unbroken condition indeterminate lengths of corn dough from roll means adapted to form the dough into sheets, which comprises a scraper wire extending along the surface of the roll means from end to end, mounting means for the scraper wire, comprising a frame having a pair of opposing arms, retaining means on the end of one of the arms for securing one end of the scraper wire, tensioning means on the other arm of the frame for receiving the scraper wire and tensioning the same, opposed frame elements adjacent to the ends of said roll means, a supporting means carried by said elements, a plurality of spaced wires passing around said roll means and over said scraper wire in engagement therewith, and tensioning means mounted on said supporting means for tensioning said spaced wires, whereby these wires closely and uniformly engage the scraper wire against the surface of the roll means throughout its length.

References Cited in the file of this patent

UNITED STATES PATENTS

| Number | Name | Date |
|---|---|---|
| 1,332,435 | De Vito | Mar. 2, 1920 |
| 1,382,926 | Mitchell | June 28, 1921 |
| 1,401,945 | Morris | Dec. 27, 1921 |
| 1,429,904 | Judson | Sept. 19, 1922 |
| 1,440,663 | Dunn | Jan. 2, 1923 |
| 1,763,445 | Romero | June 10, 1930 |
| 1,768,749 | De Vito | July 1, 1930 |
| 1,823,409 | Roehl et al. | Sept. 15, 1931 |
| 1,846,659 | Roehl et al. | Feb. 23, 1932 |
| 1,879,951 | Roehl | Sept. 27, 1932 |
| 2,002,053 | Doolin | May 21, 1935 |
| 2,111,285 | Haynie | Mar. 15, 1938 |
| 2,204,825 | Rossi | Jan. 18, 1940 |
| 2,274,416 | Junge | Feb. 24, 1942 |
| 2,319,561 | Scharsch | May 18, 1943 |